United States Patent [19]

Jacoby

[11] 4,354,761
[45] Oct. 19, 1982

[54] METHOD AND APPARATUS FOR AUTOMATIC EVALUATION OF INDENTATIONS IN HARDNESS TESTING OF MATERIALS

[75] Inventor: Hans-Dieter Jacoby, Werdorf, Fed. Rep. of Germany

[73] Assignee: Ernst Leitz Wetzlar GmbH, Wetzlar, Fed. Rep. of Germany

[21] Appl. No.: 146,423

[22] Filed: May 5, 1980

[30] Foreign Application Priority Data

May 4, 1979 [DE] Fed. Rep. of Germany ....... 2917971

[51] Int. Cl.$^3$ ...................... G01B 11/02; G01B 11/22
[52] U.S. Cl. ................................ 356/378; 250/237 R; 356/383; 356/387
[58] Field of Search ................ 356/372, 376, 378, 380, 356/383, 385, 386, 387, 384, 397, 398, 400, 241; 250/560, 237 R; 73/81

[56] References Cited

U.S. PATENT DOCUMENTS

| | | | |
|---|---|---|---|
| 2,837,968 | 6/1958 | Akashi | 356/383 |
| 3,028,544 | 4/1962 | Stone | 356/386 |
| 3,799,677 | 3/1974 | Lopez et al. | 356/384 |
| 3,822,946 | 7/1974 | Rynkowski | 356/387 |
| 4,070,117 | 1/1978 | Johannsmeier et al. | 250/237 R |
| 4,170,418 | 10/1979 | Aivchi et al. | 356/400 |

FOREIGN PATENT DOCUMENTS

| | | |
|---|---|---|
| 721918 | 6/1942 | Fed. Rep. of Germany . |
| 2737554 | 2/1978 | Fed. Rep. of Germany . |
| 2802416 | 7/1978 | Fed. Rep. of Germany ...... 356/400 |

Primary Examiner—William H. Punter
Attorney, Agent, or Firm—Schwartz, Jeffery, Schwaab, Mack, Blumenthal & Koch

[57] ABSTRACT

Method and apparatus for automatically evaluating an indentation produced in a material according to the Vickers hardness testing method. A diaphragm apertured in two coordinate directions is guided over an image of the indentation, while a photoelectric receiver system produces an electrical signal representing the luminous flux passing through the diaphragm. The electrical signal is differentiated, and changes in the differentiated signal exceeding predetermined thresholds are used to indicate detection of edges of the indentation. The respective positions of the diaphragm when the indentation edges are detected, and a known dimension of the diaphragm, are used to calculate the length of a diagonal of the indentation.

11 Claims, 7 Drawing Figures

Hardness Indentation—
Aperture Slit Misalignment

Hardness Indentation-Aperture Slit Misalignment

Luminous Flux through Slit as Slit is shifted in x-direction

Direction of scan (x)

+ Trigger Threshold
Differentiated Signal
– Trigger Threshold

METHOD AND APPARATUS FOR AUTOMATIC EVALUATION OF INDENTATIONS IN HARDNESS TESTING OF MATERIALS

BACKGROUND OF THE INVENTION

1. Field of the Invention

The invention concerns a method for automatic hardness testing of materials according to Vickers, in which varying brightness in an image of an indentation produced in the material is photoelectrically scanned and evaluated in order to determine the length of the diagonal of the indentation. The invention further concerns apparatus for carrying out the method.

With the method and apparatus of the invention, the hardness of a material is determined by measuring the dimensions of an indentation produced in the material by an indentor in order to ascertain the depth of penetration of the indentor.

2. The Prior Art

The Vickers method of hardness testing involves pressing the apex of a square-pyramid-shaped diamond having a predetermined apical angle into the material to be tested, under a load. The Vickers hardness number is then calculated according to the formula:

$$V = P/0.5393 \ (1)^2$$

where P is the imposed load in kilograms and 1 is the diagonal of the indentation in millimeters.

To measure such indentions, it is known from U.S. Pat. No. 3,822,946 to scan the indentation produced in the material by the indentor with an optical beam and to use a photoelement to produce electrical signals from the multiple reflections of this beam, the amplitude of the electrical signals being proportional to the dimension of the indentation following logic processing.

Proceeding from densitometric processes, it is known from German patent DE-PS No. 721 918 to pass the slit of a selenium cell photometer over the indentation, while applying dark field illumination, to measure such indentations in metallic materials and to use the change in surface brightness as a mark of the beginning and end of the gauge length.

Both of these arrangements require illuminating equipment with—as described in the case of German patent DE-PS No. 721 918—special provisions. The technical outlay for auxiliary apparatus is thus very substantial.

German published application DE-OS No. 27 37 554 describes a device for hardness testing having means for measuring the diagonal length of the indentation, wherein an image converter comprising a plurality of photoelectric converter elements is arranged in an image plane upon which a bright and dark image of the indentation is effected by means of an optical device. A unit is provided for determining the diagonal length of the indentation in dependence upon the output signal of the image converter.

A precondition for the attainment of accurate measuring results is, however, homogeneity of the photoelectric converter elements of the image converter, which is nearly unattainable from a manufacturing standpoint. This leads either to potentially false measuring results or to costly selection of converter elements.

SUMMARY OF THE INVENTION

It is therefore the object of the present invention to provide a method and apparatus for the automatic evaluation of indentations in the hardness testing of materials, with which the disadvantages of the described prior art arrangements are avoided and objective measurement of the dimensions of the hardness indentation is made possible without precise alignment of the specimens with the measuring instrument.

The present invention concerns a method for automatically evaluating an indentation produced in a material according to the Vickers hardness testing method. The method of the invention includes the steps of:

(a) producing an image of the indentation;

(b) scanning edges of the indentation by guiding a diaphragm, apertured in two coordinate directions, over the image of the indentation in a direction parallel to a diagonal of the indentation;

(c) producing electrical signals representing the luminous flux passing through the diaphragm, the electrical signals varying in proportion to surface brightness of the material;

(d) determining from the electrical signals values representing the relative positions of edges of the indentation as well as the magnitude of the scanning movement of the diaphragm from edge to edge; and (e) calculating from the values the length of the diagonal of the indentation, the length of the diagonal being dependent upon the hardness of the material.

The invention also concerns apparatus for automatically evaluating an indentation produced in a material according to the Vickers hardness testing method, comprising:

(a) apparatus for producing an image of the indentation;

(b) a diaphragm apertured in two coordinate directions, the diaphragm disposed in the plane of the image of the indentation;

(c) apparatus for scanning the edges of the indentation by guiding the diaphragm over the image of the indentation;

(d) apparatus for detecting position of the diaphragm as it is guided over the image of the indentation;

(e) at least one photoelectric receiver system coordinated with the diaphragm for producing an electrical signal representing the luminous flux passing through the diaphragm;

(f) a filter stage for differentiating the electrical signal produced by the photoelectric receiver system, the differentiated signal changing to indicate detection of each edge of the indentation;

(g) a counter, responsive to the diaphragm position detecting apparatus, for storing values representing positions of the diaphragm as the diaphragm is guided over the image of the indentation;

(h) circuits responsive to changes in the differentiated signal for causing the counter to output a value representing the position of the diaphragm relative to the indentation; and (i) apparatus for calculating, from the values output by the counter and the dimensions of the aperture or apertures, the relative positions of edges of the indentation and the length of a diagonal of the indentation, the length of the diagonal being dependent upon the hardness of the material.

It is proposed according to the invention that the apparatus guiding the diaphragm is the carriage of a coordinate table and that a linear step transducer of a known type is provided as the measuring instrument.

It is further proposed to use trigger circuits as electronic switching stages for the generation of coincidence signals.

According to one form of the invention, the diaphragm is equipped with two slits which enclose an angle matched to the angle formed by adjacent edges of the indentation.

It is, however, also possible to provide the diaphragm with two angular slits, being located diametrically opposite to each other, the adjacent legs of each of which enclose an angle matching the angle enclosed by the adjacent edges of the indentation.

The invention is represented schematically in the drawing and is described below in more detail.

THE PREFERRED EMBODIMENT

Figure 1:
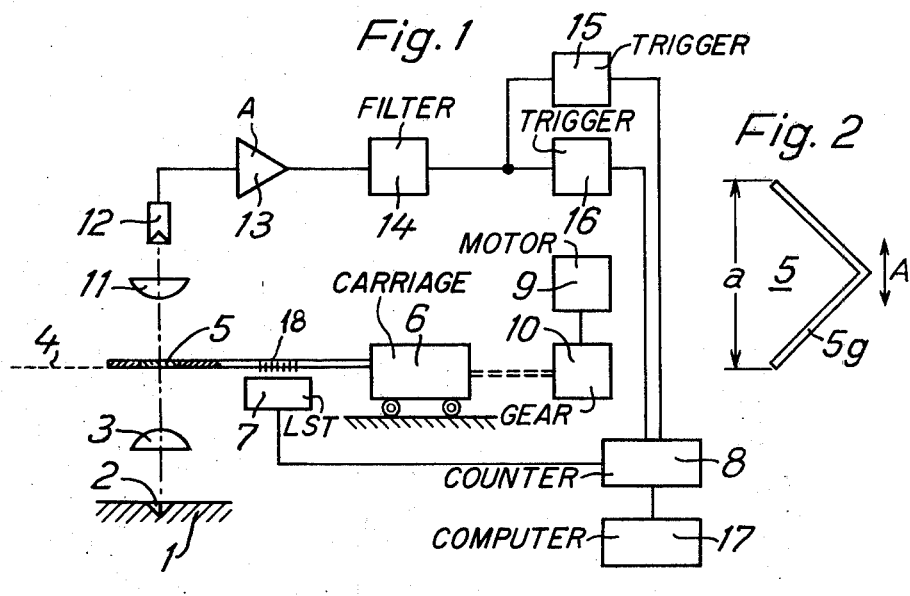
FIG. 1 shows the schematic layout of the apparatus according to the invention.

In FIG. 1, an indentation 2 formed in a material 1 to determine its hardness is reproduced by means of an imaging system 3 in an image plane 4. For determining the extent of the indentation 2, a diaphragm 5 for scanning the indentation 2 is located in the image plane 4. For executing the scanning movement, diaphragm 5 being coupled with the carriage 6 of a coordinate table, shown schematically, and guided by carriage 6 over the image projected in the image plane 4 of the impression 2.

To measure the diaphragm position, a known type of linear step transducer 7 is coordinated with carriage 6 and coupled to a counter 8. Carriage 6 is driven by a motor 9 by means of a gear 10 coupled between the motor 9 and carriage 6. The linear step transducer 7 may be, for example, of the type available from Ernst Leitz Wetzlar GmbH, D-6330 Wetzlar, Federal Republic of Germany, under the designation "Laengenschrittgeber LSG-A 2o/A 40." The coordinate table and carriage 6 may be, for example, of the type available in modular form from Ernst Leitz Wetzlar GmbH as scanning stage accessories for the "Leitz-MPV-System" microscope photometer or the "Leitz-T.A.S. Texture Analyzing System."

Figure 2:
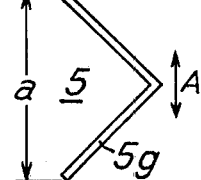
FIGS. 2, 2a and 3 show embodiments of the diaphragm in the apparatus of FIG. 1.
Figure 2A:
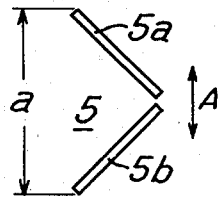
Figure 3:
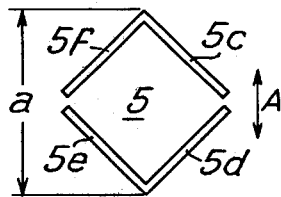

Preferred configurations of the diaphragm 5 are as shown in FIGS. 2, 2a and 3. In FIG. 2, it consists of one aperture slit 5g, while in FIG. 2a it consists of two aperture slits 5a and 5b. The slits form an angle matched to the angle enclosed by adjacent edges of the indentation 2.

FIG. 3 shows a variant of the diaphragm 5. Here, it consists of the slits 5c–5f arranged in axial symmetry, wherein the opposing aperture slit legs 5c and 5e, and 5d and 5f, respectively, are parallel to each other and the adjacent aperture slit legs 5c and 5d, and 5e and 5f, respectively, enclose an angle matched to the angle enclosed by the corresponding adjacent edges of the indentation.

The diaphragm 5 according to FIGS. 2, 2a and 3 is oriented with respect to the indentation 2 so that the direction indicated in these figures by the double arrows A coincides with the diagonal of the indentation 2. Precise alignment of the diaphragm 5 and the indentation 2 is not absolutely necessary, but is possible with the aid of the ocular of the hardness tester, not shown.

When by means of the motion of carriage 6 the diaphragm 5 is passed over the image of the indentation 2, the luminous flux passing through the diaphragm 5 is conducted by way of a condensing lens system 11 to a photoelectric receiver system 12.

During observation, the indentation 2 and its image appear darker than the surrounding field, because only a slight portion of the light reflected from the surface of the indentation arrives in the imaging system 3.

As the diaphragm 5 is moved over the image of the indentation 2, the luminous flux arriving at the photoelectric receiver system 12 will therefore vary. Specifically, the luminous flux will be reduced when the diaphragm 5 is located over the indentation or its image, as compared with when the diaphragm is ahead of or behind the indentation in the scanning direction. Electrical signals produced by the photoelectric receiver system 12 in dependence on its exposure to light will then vary accordingly.

A particularly marked change in the signal occurs when an edge of indentation 2 is scanned by an aperture slit of diaphragm 5. It is thus necessary to identify the location of the diaphragm when each such signal change occurs.

For this purpose, as mentioned above, the linear step transducer 7 is coordinated with the carriage 6 of the coordinate table, not shown in detail, such that the linear step transducer measures position of the diaphragm 5 as it is guided by carriage 6 over the indentation 2 or its image, for example by detecting ruled markings 18 on the diaphragm 5. Position information is supplied by the linear step transducer 7 to counter 8.

Upon encountering an edge of the indentation, i.e. when a significant drop occurs in the luminous flux, causing a change in the output signal of the photoelectric receiver system 12, the value stored in the counter 8 must be called up. This is done by passing the output signal of the photoelectric receiver system 12 by way of a signal amplifier 13 to a filter stage 14, for differentiating the zero crossings of the output signal the output of which indicates the maximum positive or negative change in the signal. These signal changes are used to call up the position values stored in the counter 8. The values are called up by means of triggers 15 and 16. Trigger 15 is responsive to a negative signal change for calling up a diaphragm position value and trigger 16 is responsive to a positive signal change for calling up a diaphragm position value. That is, when the potential at the output of filter stage 14 exceeds the respective threshold value of one of triggers 15 and 16, the output signal of that trigger changes. This trigger output signal change is used as a coincidence signal to call up a diaphragm position value from counter 8. The position values are then transferred to and stored in a computer 17 determining therefrom the magnitude of the scanning movement from edge to edge of the indentation. The length "l" of the indentation diagonal may then be calculated, using the known dimension "a" of the scanning slit 5 and the coincidence position values.

Figure 4:
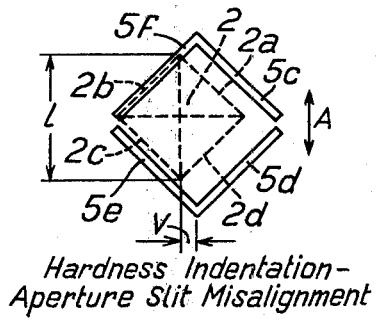
FIG. 4 shows scanning positions of the diaphragm relative to an indentation.
Figure 5:
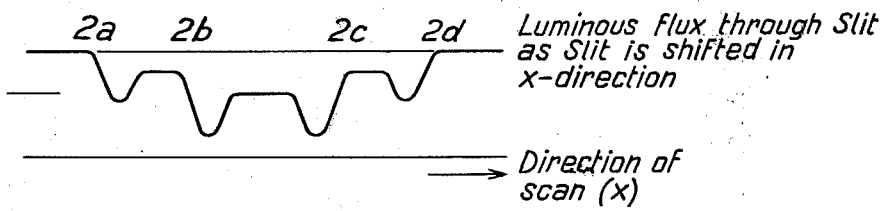
FIG. 5 shows a luminous flux diagram during displacement of the diaphragm.
Figure 6:
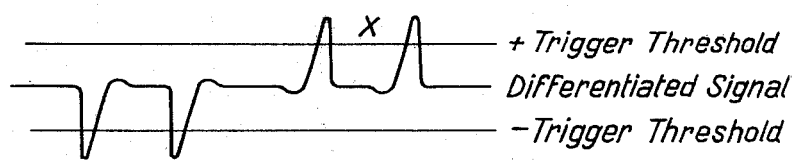
FIG. 6 shows a signal diagram resulting from the scanning.

The edges of the indentation 2 may be identified in a better and more clear-cut manner by introducing a deliberate misalignment "V," as shown in FIG. 4, between the diagonals of the indentation 2 and the diaphragm 5 in a direction transverse to the scanning direction x. Consequently, when the indentation edges 2a-2d are scanned by the slits 5c-5f of the diaphragm 5, the change in the luminous flux does not occur at the same time for any two of the indentation edges (FIG. 5). The signals are thus produced as follows:

Motion of the diaphragm 5 by means of carriage 6 over the image of the indentation 2 in the image plane 4 is measured by linear step transducer 7 and the counting pulses thereby generated are passed to counter 8.

At the time of the scanning of the edge 2a of the indentation, i.e. upon the appearance of the marked decline in the luminous flux, the diaphragm position value then stored in the counter 8 must be called up.

This is effected by the photoelectric receiver system 12, which generates an electrical signal in dependence on its exposure to the light from the image of the indentation 2; this signal is preamplified in the signal amplifier 13 and passed to the filter stage 14.

The same process is repeated upon the scanning of the indentation edges 2b-2d. As shown in FIG. 5, the signal has its highest peaks at the points where the luminous flux originating from the indentation 2 exhibits its greatest changes, i.e. upon scanning indentation edges 2a-2d. At edges 2a and 2b the signal is negative, i.e. the intensity of the luminous flux decreases, while at edges 2c and 2d it is positive, i.e. the intensity of the luminous flux increases, when the diaphragm is moved relative to the indentation in a direction parallel to a diagonal thereof and in the upward direction in FIG. 4.

For this reason, as described hereinabove, the triggers 15 and 16, respectively, are constructed as "plus" and "minus" triggers. As soon as the potential at the output of the filter stage exceeds the threshold value of one of triggers 15 and 16, the output signal of that trigger changes. This change in the signal is used as a coincidence signal for the callup of a positive value from counter 8.

The four values determined are transferred for storage in the computer 17 in response to the respective trigger output (coincidence) signals. Initially, the calculator 17 computes an arithmetic mean value $x_0$ representing the position of the upper half of indentation 2 from the position values obtained from the scanning of edges 2a and 2b of the indentation 2. An arithmetic means value $x_u$ is also calculated from the position values obtained from the scanning of edges 2c and 2d, this value representing the position of the lower half of indentation 2.

The actual size of the indentation 2 may then be determined, since it is known that the diaphragm 5 shown in FIGS. 2a and 3 has a diagonal of length "a". This means that the length "l" of the diagonal of the indentation is calculated from the formula:

$$l = a - (x_o - x_u).$$

Once the length of the diagonal of the indentation has been calculated, the Vickers hardness number of the material can be calculated, assuming that the load imposed in producing the indentation is known.

Computer 17 is shown schematically in FIG. 1 for simplicity, and it will be recognized by those of skill in the art that any suitable general purpose unit having appropriate input and output capabilities may be readily programmed to perform the described calculations. Suitable computers are, for example, the Wang 2200 VP, 32 K; or HP 9835 or HP 9845, 128 K computers; as employed in the "Leitz PMM 864" measuring machine available from Ernst Leitz Wetzlar GmbH.

I claim:

1. A method for automatically evaluating an indentation produced in a material according to the Vickers hardness testing method, comprising the steps of:
   (a) producing an image of the indentation;
   (b) scanning edges of the indentation by guiding a diaphragm, having two slits, each of which is apertured in two coordinate directions, over the image of the indentation in a direction parallel to a diagonal of the indentation;
   (c) producing electrical signals representing the luminous flux passing through the diaphragm, the electrical signals varying in proportion to surface brightness of the material;
   (d) determining from the electrical signals values representing the relative position of edges of the indentation as well as the magnitude of the scanning movement of the diaphragm from edge to edge; and
   (e) calculating from said values the length of said diagonal of the indentation, the length of said diagonal being dependent upon the hardness of the material.

2. The method of claim 1, further comprising the step of calculating, from the length of said diagonal and from the magnitude of the load imposed in producing the indentation, the Vickers hardness number of the material.

3. Apparatus for automatically evaluating an indentation produced in a material according to the Vickers hardness testing method, comprising:
   (a) means for producing an image of the indentation;
   (b) a diaphragm apertured in two coordinate directions, said diaphragm disposed in the plane of the image of the indentation;
   (c) means for scanning edges of the indentation by guiding the diaphragm over the image of the indentation;
   (d) means for detecting position of the diaphragm as it is guided over the image of the indentation;
   (e) at least one photoelectric receiver system coordinated with the diaphragm for producing an electrical signal representing the luminous flux passing through the diaphragm;
   (f) a filter stage for differentiating the electrical signal produced by said at least one photoelectric receiver system, said differentiated signal changing to indicate detection of each edge of said indentation;
   (g) a counter, responsive to said diaphragm position detecting means, for storing values representing positions of said diaphragm as said diaphragm is guided over the image of the indentation;
   (h) circuit means responsive to each change in said differentiated signal for causing said counter to output a value representing the position of the diaphragm relative to said indentation; and
   (i) means operatively connected for calculating, from values output by said counter and the dimensions of the aperture or apertures, the relative positions of edges of the indentation and the length of a diagonal of the indentation, the length of said diagonal being dependent upon the hardness of the material.

4. The apparatus of claim 3, wherein said scanning means comprises a coordinate table having a movable carriage on which said diaphragm is mounted.

5. The apparatus of claim 3, wherein said position detecting means comprises a linear step transducer.

6. The apparatus of claim 3, wherein said circuit means comprises first and second trigger circuits, said first trigger circuit providing a first coincidence signal when said differentiated signal exceeds a positive threshold level, and said second trigger circuit providing a second coincidence signal when said differentiated signal falls below a negative threshold level, said counter responding to each said coincidence signal by outputting a value representing the position of the diaphragm relative to the indentation.

7. The apparatus of claim 3, wherein adjacent edges of the indentation enclose a predetermined angle, the diaphragm having two adjacent aperture slits enclosing said predetermined angle.

8. The apparatus of claim 3, wherein adjacent edges of the indentation enclose a predetermined angle, the diaphragm having at least one aperture slit, said at least one aperture slit having two legs mutually enclosing said predetermined angle.

9. The apparatus of claim 8, wherein said diaphragm has two said aperture slits, each said aperture slit having two legs mutually enclosing said predetermined angle.

10. The apparatus of claim 3, wherein said calculating means is further operative for calculating from the length of said diagonal the Vickers hardness number of the material.

11. A method for automatically evaluating an indentation produced in a material according to the Vickers hardness testing method, comprising the steps of:
    (a) producing an image of the indentation;
    (b) scanning edges of the indentation by guiding a diaphragm, apertured to form slits in two coordinate directions, over the image of the indentation in a direction parallel to a diagonal of the indentation such that the slits are positioned one in front of the other in the scan direction;
    (c) producing electrical signals representing the luminous flux passing through the diaphragm, the electrical signals varying in proportion to surface brightness of the material;
    (d) determining from the electrical signals values representing the relative position of edges of the indentation as well as the magnitude of the scanning movement of the diaphragm from edge to edge; and
    (e) calculating from said values the length of said diagonal of the indentation, the length of said diagonal being dependent upon the hardness of the material.

* * * * *